(12) United States Patent
Kato et al.

(10) Patent No.: US 9,661,181 B2
(45) Date of Patent: May 23, 2017

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventors: Minako Kato, Kawasaki (JP); Yumi Yanai, Yokohama (JP); Masao Kato, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/971,271

(22) Filed: Dec. 16, 2015

(65) Prior Publication Data

US 2016/0173725 A1    Jun. 16, 2016

(30) Foreign Application Priority Data

Dec. 16, 2014 (JP) .................. 2014-254017

(51) Int. Cl.
| | |
|---|---|
| *H04N 1/405* | (2006.01) |
| *G06K 15/00* | (2006.01) |
| *G06K 15/02* | (2006.01) |
| *B41J 2/21* | (2006.01) |
| *H04N 1/52* | (2006.01) |

(52) U.S. Cl.
CPC .......... *H04N 1/4053* (2013.01); *B41J 2/2103* (2013.01); *G06K 15/1881* (2013.01); *H04N 1/4051* (2013.01); *H04N 1/52* (2013.01)

(58) Field of Classification Search
CPC ...... H04N 1/4053; H04N 1/4051; H04N 1/52; B41J 2/2103; G06K 15/1881

USPC ........ 358/3.03, 3.06, 1.9, 1.8, 534–536, 448
See application file for complete search history.

(56) References Cited

U.S. PATENT DOCUMENTS

| | | |
|---|---|---|
| 5,289,293 A | 2/1994 | Kato |
| 5,351,137 A | 9/1994 | Kato |
| 6,031,627 A | 2/2000 | Kakutani |
| 6,148,031 A | 11/2000 | Kato |

(Continued)

OTHER PUBLICATIONS

U.S. Appl. No. 14/971,287, filed Dec. 16, 2015.

(Continued)

*Primary Examiner* — Quang N Vo
(74) *Attorney, Agent, or Firm* — Fitzpatrick, Cella, Harper & Scinto

(57) ABSTRACT

An image processing apparatus has a data acquisition unit that acquires first multi-valued data for a first ink that is not black ink and second multi-valued data for a second ink that is black ink; a threshold value acquisition unit that acquires a threshold value from a threshold value matrix; an offsetting unit that offsets at least one of the threshold value and the second multi-valued data; and a generating unit that generates first quantized data for the first ink by comparing the first multi-valued data and the threshold value, and generate second quantized data for the second ink by comparing the second multi-valued data and the threshold value with offset by the offsetting unit. Dispersibility of dots printed at positions corresponding to threshold values from a minimum value to a predetermined value is higher than that corresponding to threshold values except from the minimum value to the predetermined value.

22 Claims, 11 Drawing Sheets

(56) References Cited

U.S. PATENT DOCUMENTS

| | | | |
|---|---|---|---|
| 6,250,733 B1 | 6/2001 | Yao | |
| 6,542,642 B2 | 4/2003 | Takizawa | |
| 6,665,446 B1 | 12/2003 | Kato | |
| 6,738,160 B1 | 5/2004 | Kato | |
| 6,867,884 B1 | 3/2005 | Rozzi | |
| 7,099,046 B2 | 8/2006 | Yamada | |
| 7,312,901 B2 | 12/2007 | Yamada | |
| 7,437,011 B2 | 10/2008 | Kato | |
| 7,548,346 B2 | 6/2009 | Yamada | |
| 7,672,011 B2 | 3/2010 | Kato | |
| 7,855,809 B2 | 12/2010 | Kato | |
| 7,859,723 B2 | 12/2010 | Yamada | |
| 7,965,418 B2 | 6/2011 | Yamada | |
| 2002/0154185 A1* | 10/2002 | Bauer | B41J 2/04508 347/14 |
| 2003/0133606 A1 | 7/2003 | Yano | |
| 2004/0218221 A1* | 11/2004 | Hirano | H04N 1/40087 358/3.06 |
| 2010/0259793 A1* | 10/2010 | Wakayama | H04N 1/405 358/3.03 |

OTHER PUBLICATIONS

U.S. Appl. No. 14/971,277, filed Dec. 16, 2015.
U.S. Appl. No. 14/991,618, filed Jan. 8, 2016.
European Search Report issued on May 2, 2016 during prosecution of related European application No. 15003591.3-1903.

* cited by examiner

| 36 | 36 | 36 | 36 | 36 | 36 | 36 | 36 | 36 | 36 |
|----|----|----|----|----|----|----|----|----|----|
| 36 | 36 | 36 | 36 | 36 | 36 | 36 | 36 | 36 | 36 |
| 36 | 36 | 36 | 36 | 36 | 36 | 36 | 36 | 36 | 36 |
| 36 | 36 | 36 | 36 | 36 | 36 | 36 | 36 | 36 | 36 |
| 36 | 36 | 36 | 36 | 36 | 36 | 36 | 36 | 36 | 36 |
| 36 | 36 | 36 | 36 | 36 | 36 | 36 | 36 | 36 | 36 |
| 36 | 36 | 36 | 36 | 36 | 36 | 36 | 36 | 36 | 36 |
| 36 | 36 | 36 | 36 | 36 | 36 | 36 | 36 | 36 | 36 |
| 36 | 36 | 36 | 36 | 36 | 36 | 36 | 36 | 36 | 36 |
| 36 | 36 | 36 | 36 | 36 | 36 | 36 | 36 | 36 | 36 |

| 24  | 138 | 55  | 230 | 183 | 66  | 238 | 189 | 75  | 25  |
|-----|-----|-----|-----|-----|-----|-----|-----|-----|-----|
| 215 | 180 | 12  | 158 | 88  | 207 | 115 | 4   | 155 | 215 |
| 121 | 71  | 248 | 106 | 45  | 26  | 168 | 59  | 250 | 43  |
| 157 | 33  | 134 | 189 | 220 | 143 | 229 | 93  | 135 | 109 |
| 196 | 224 | 84  | 7   | 120 | 71  | 183 | 16  | 204 | 66  |
| 17  | 60  | 164 | 209 | 53  | 246 | 105 | 39  | 162 | 244 |
| 112 | 251 | 98  | 145 | 31  | 172 | 139 | 215 | 80  | 121 |
| 215 | 175 | 23  | 199 | 235 | 88  | 10  | 190 | 54  | 224 |
| 77  | 50  | 133 | 72  | 116 | 59  | 126 | 232 | 26  | 145 |
| 157 | 192 | 228 | 0   | 178 | 208 | 151 | 99  | 169 | 86  |

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, image processing method, and storage medium for performing a quantization process to form an image on a print medium.

Description of the Related Art

When using a pseudo gradation method to print an image, it is necessary to quantize multi-valued image data, and as a quantization method used for the quantization, an error diffusion method and a dither method are known. In particular, the dither method that compares a preliminarily stored threshold value and a gradation value of multi-valued data to determine dot printing or non-printing is widely used in many image processing apparatuses because a processing load is small as compared with the error diffusion method. Such a dither method has a problem of dot dispersibility in particular in a low gradation range; however, as a threshold value matrix for obtaining preferable dot dispersibility, a threshold value matrix having blue noise characteristics is proposed.

FIGS. 9A to 9C are diagrams for explaining a dither process using a threshold value matrix having blue noise characteristics. FIG. 9A illustrates an example of image data to be inputted into a 10-pixel×10-pixel area. This example shows a state where a gradation value of "36" is inputted into all the pixels. FIG. 9B illustrates a threshold value matrix prepared corresponding to the above 10-pixel×10-pixel area. Each of the pixels is related to any of threshold values of 0 to 254. In the dither method, in the case where a gradation value indicated by multi-valued image data is larger than a threshold value, a corresponding pixel is designated as dot printing "1". On the other hand, in the case where a gradation value indicated by multi-valued image data is equal to or less than a threshold value, a corresponding pixel is designated as dot non-printing "0". FIG. 9C illustrates a quantization result based on the dither method. Pixels representing printing "1" are indicated in gray, and pixels representing non-printing "0" are indicated in white. The distribution of printing "1" pixels as seen in FIG. 9C changes depending on threshold value arrangement in the threshold value matrix. By using the threshold value matrix having blue noise characteristics as in FIG. 9B, even in the case where the same pieces of multi-valued data are inputted into a predetermined area as in FIG. 9A, the printing "1" pixels are arranged in a high dispersibility state as in FIG. 9C.

FIGS. 10A and 10B are diagrams illustrating blue noise characteristics and human visual characteristics or a human transfer function (VTF) at a visibility distance of 250 mm. In both of the diagrams, the horizontal axis represents a frequency (cycles/mm), indicating lower and higher frequencies toward the left and right of the graph, respectively. On the other hand, the vertical axis represents intensity (power) corresponding to each frequency.

Referring to FIG. 10A, the blue noise characteristics are characterized by, for example, a suppressed low frequency component, a rapid rise, and a flat high frequency component. Hereinafter, a frequency fg corresponding to a peak resulting from the rapid rise is referred to as a principal frequency. On the other hand, as illustrated in FIG. 10B, the human visual characteristics have high sensitivity in a lower frequency range, but sensitivity in a higher frequency range is low. That is, the lower frequency component is conspicuous, whereas the higher frequency component is inconspicuous. The blue noise characteristics are based on such visual characteristics, and adapted to, in the visual characteristics, hardly has power in the highly sensitive (conspicuous) lower frequency range, but has power in the low sensitive (inconspicuous) higher frequency range. For this reason, when a person visually observes an image subjected to a quantization process using a threshold value matrix having blue noise characteristics, dot deviation or periodicity is unlikely to be perceived, and the image is recognized as a comfortable image.

However, in the quantization process as described above, preferable dispersibility can be obtained for each color material (i.e., each single color); however, when printing an image with multiple color materials (i.e., mixed color), dispersibility may be deteriorated to make graininess conspicuous. This is caused by the fact that threshold value matrices prepared for respective color materials do not have any correlation with one another at all.

U.S. Pat. No. 6,867,884 discloses a dither method for solving such a problem. Specifically, U.S. Pat. No. 6,867,884 discloses a method that prepares one common dither matric having preferable dispersibility as in FIG. 9B, and performs a quantization process while shifting mutual threshold values among multiple colors. According to U.S. Pat. No. 6,867,884 as described, dots having different colors are mutually exclusively printed in a highly dispersible state in a low gradation area, and therefore even in a mixed color image, preferable image quality can be achieved.

However, the method disclosed in U.S. Pat. No. 6,867,884 focuses on the graininess and dispersibility in a mixed color image, but does not focus on a pseudo contour associated with a shift in gradation level. In the following, such a pseudo contour will be described.

In the blue noise characteristics described with FIG. 10A, the principal frequency fg is an average frequency when dispersing a predetermined number of dots as uniformly as possible; however, the principal frequency fg depends on the density of the dots, i.e., gradation.

FIGS. 11A and 11B are diagrams illustrating the relationship between a gradation value (i.e., the dot density) and the principal frequency fg. In FIG. 11A, the horizontal axis represents a gray level g (i.e., the dot density), and the vertical axis represents the principal frequency fg at each gray level. The gray level g is given on the assumption that a state where dots are placed in all pixels in an image area corresponds to "1", a state where no dots are placed in all the pixels to "0", and a state where dots are placed in half of the pixels to "½". The principal frequency fg in this case can be expressed by Expression 1.

$$f_g = \begin{cases} \sqrt{g}\,|u| & g \leq \frac{1}{2} \\ \sqrt{1-g}\,|u| & g > \frac{1}{2} \end{cases} \quad \text{(Expression 1)}$$

In Expression 1, u represents the reciprocal of a pixel spacing. As can be seen from FIG. 11A and Expression 1, the principal frequency fg takes the maximum value of $f_g = \sqrt{(1/2)}|u|$ at a gray level of $g=\frac{1}{2}$, i.e., when dots are arranged in 50% of the pixels in the entire pixel area. In addition, as the gray level g separates from ½, the principal frequency fg also gradually shifts toward the lower frequency side.

FIG. 11B is a diagram illustrating frequency characteristics in four types of gradation lower than a gray level g of ½ when performing a quantization process using a threshold value matrix having blue noise characteristics, together with the visual characteristics VTF. The diagram illustrates the case where the first gradation has the lowest gray level, and the gray level increases from the second to the third, to the fourth. Blue noise characteristics indicating that a lower frequency component is suppressed, and in a higher frequency range, there is a peak at a principal frequency fg are common to all the types of gradation. However, the principal frequencies fg in the first gradation and the second gradation are present within a range of 2 to 4 cycles/mm, which are also close to the peak of the VTF. That is, a dot pattern in lower gradation has blue noise characteristics, but the dot pattern itself is easily visually perceived.

On the other hand, between the principal frequencies fg in the first gradation and the second gradation, there is a shift of approximately 1 cycles/mm. That is, in a gradation image of which gradation gradually shifts from the first gradation to the second gradation, the shift from a first gradation dot pattern to a second gradation dot pattern is easily visually perceived. For this reason, even in the case where each of the first gradation dot pattern and the second gradation dot pattern is not visually uncomfortable, the discontinuity in dot pattern from the first gradation to the second gradation causes a visually uncomfortable "pseudo contour" to deteriorate image quality.

U.S. Pat. No. 6,867,884 does not focus on any pseudo contour as described above. As a result, U.S. Pat. No. 6,867,884 discloses an embodiment where increasing the dispersibility of a black ink having the highest contrast among multiple color inks is given priority, and black is set for a channel having the lowest threshold value area among multiple channels corresponding to the common threshold value matrix. In this case, if the threshold value matrix has blue noise characteristics, the dot arrangement of the black ink will have blue noise characteristics as described above from lower gradation to higher gradation. As a result, frequency characteristics in a black ink dot patterns will be those as illustrated in FIG. 11B, which may cause the "pseudo contour" to deteriorate image quality.

SUMMARY OF THE INVENTION

The present invention is made in order to solve the above-described problem, and intends to provide an image processing apparatus and image processing method that can perform a dither process that prevents a pseudo contour associated with a shift in gradation level from being recognized despite suppressing graininess in a mixed color image.

According to a first aspect of the present invention, there is provided an image processing apparatus for printing an image on a print medium with use of multiple inks, the image processing apparatus comprising: a data acquisition unit configured to, for a target pixel, acquire first multi-valued data corresponding to a first ink and second multi-valued data corresponding to a second ink; a threshold value acquisition unit configured to acquire a first threshold value corresponding to the target pixel from a threshold value matrix that indicates an array of multiple threshold values; an offsetting unit configured to offset at least one of the first threshold value and the second multi-valued data, according to the first multi-valued data; and a generating unit configured to generate first quantized data for printing a dot of the first ink by comparing the first multi-valued data and the first threshold value, and generate second quantized data for printing a dot of the second ink by comparing the second multi-valued data and the first threshold value with offset the difference between the second multi-valued data and the first threshold value according to the first multi-valued data by the offsetting unit, wherein: the threshold value matrix is characterized in that dispersibility of dots printed at positions corresponding to threshold values being continuous from a minimum value to a predetermined value is higher than dispersibility of dots printed at positions corresponding to threshold values being continuous except for from the minimum value to the predetermined value; and the first ink is an ink of a color different from black, and the second ink is a black ink.

According to a second aspect of the present invention, there is provided an image processing method for printing an image on a print medium with use of multiple inks, the image processing method comprising steps of: acquiring, for a target pixel, first multi-valued data corresponding to a first ink and second multi-valued data corresponding to a second ink; reading out a first threshold value corresponding to the target pixel from a threshold value matrix that indicates an array of multiple threshold values; offsetting at least one of the first threshold value and the second multi-valued data, according to the first multi-valued data; and generating first quantized data for printing a dot of the first ink by comparing the first multi-valued data and the first threshold value, and generating second quantized data for printing a dot of the second ink by comparing the second multi-valued data and the first threshold value with offset the difference between the second multi-valued data and the first threshold value according to the first multi-valued data by the offsetting unit, wherein: the threshold value matrix is characterized in that dispersibility of dots printed at positions corresponding to threshold values being continuous from a minimum value to a predetermined value is higher than dispersibility of dots printed at positions corresponding to threshold values are continuous except for from the minimum value to the predetermined value; and the first ink is an ink of a color different from black, and the second ink is a black ink.

According to a third aspect of the present invention, there is provided a storage medium that stores a program for instructing a computer to function as respective units of an image processing apparatus for printing an image on a print medium with use of multiple inks, wherein the image processing apparatus comprising: a data acquisition unit configured to, for a target pixel, acquire first multi-valued data corresponding to a first ink and second multi-valued data corresponding to a second ink; a threshold value acquisition unit configured to acquire a first threshold value corresponding to the target pixel from a threshold value matrix that indicates an array of multiple threshold values; an offsetting unit configured to offset at least one of the first threshold value and the second multi-valued data, according to the first multi-valued data; and a generating unit configured to generate first quantized data for printing a dot of the first ink by comparing the first multi-valued data and the first threshold value, and generate second quantized data for printing a dot of the second ink by comparing the second multi-valued data and the first threshold value with offset the difference between the second multi-valued data and the first threshold value according to the first multi-valued data by the offsetting unit, wherein: the threshold value matrix is characterized in that dispersibility of dots printed at positions corresponding to threshold values being continuous from a minimum value to a predetermined value is higher than dispersibility of dots printed at positions corresponding to threshold values being continuous except for from the minimum value to the predetermined value; and the first ink is an ink of a color different from black, and the second ink is a black ink.

Further features of the present invention will become apparent from the following description of exemplary embodiments (with reference to the attached drawings).

DESCRIPTION OF THE EMBODIMENTS

First Embodiment

Figure 1:
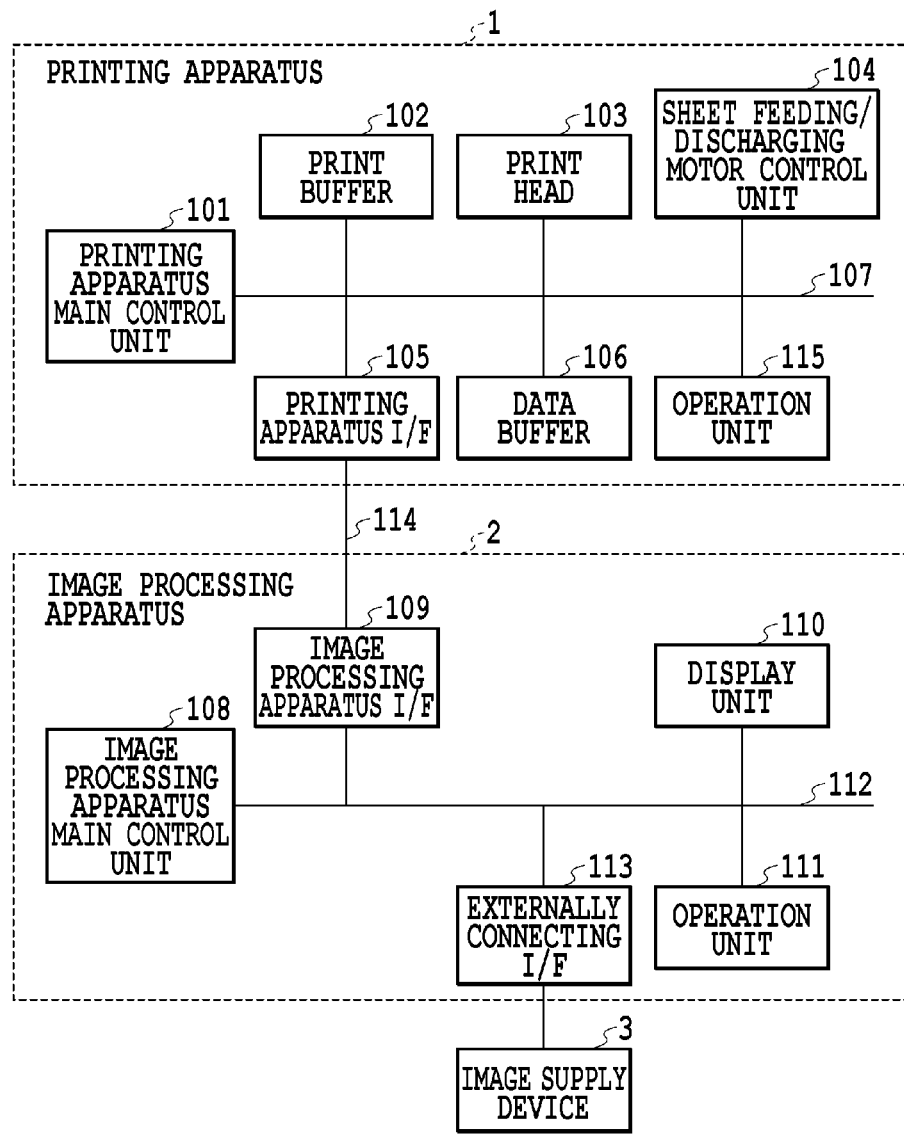
FIG. 1 is a block diagram illustrating the configuration of an inkjet printing system control.

FIG. 1 is a block diagram illustrating the configuration of an inkjet printing system control applicable to the present invention. The inkjet printing system in the present embodiment is configured to include an image supply device 3, an image processing apparatus 2, and an inkjet printing apparatus 1 (hereinafter also simply referred to as a printing apparatus). Image data supplied from the image supply device 3 is subjected to a predetermined image process in the image processing apparatus 2, and then sent to the printing apparatus 1 for printing.

In the printing apparatus 1, a printing apparatus main control unit 101 is one for controlling the whole of the printing apparatus 1, and configured to include a CPU, ROM, RAM, and the like. The print buffer 102 can store image data before transfer to a print head 103 as raster data. The print head 103 is an inkjet type print head having multiple printing elements capable of ejecting inks as droplets, and in accordance with image data stored in the print buffer 102, ejects inks from respective printing elements. In the present embodiment, it is assumed that printing element arrays for four colors of cyan, magenta, yellow, and black are arrayed on the print head 103.

A sheet feeding/discharging motor control unit 104 controls conveyance and feeding/discharging of print media. A printing apparatus interface (I/F) 105 transceives a data signal with the image processing apparatus 2. An I/F signal line 114 connects the both. As the I/F signal line 114, one specified by, for example, Centronics Data Computer Corporation can be applied. A data buffer 106 temporarily stores image data received from the image processing apparatus 2. A system bus 107 connects the respective functions of the printing apparatus 1.

Figure 2:
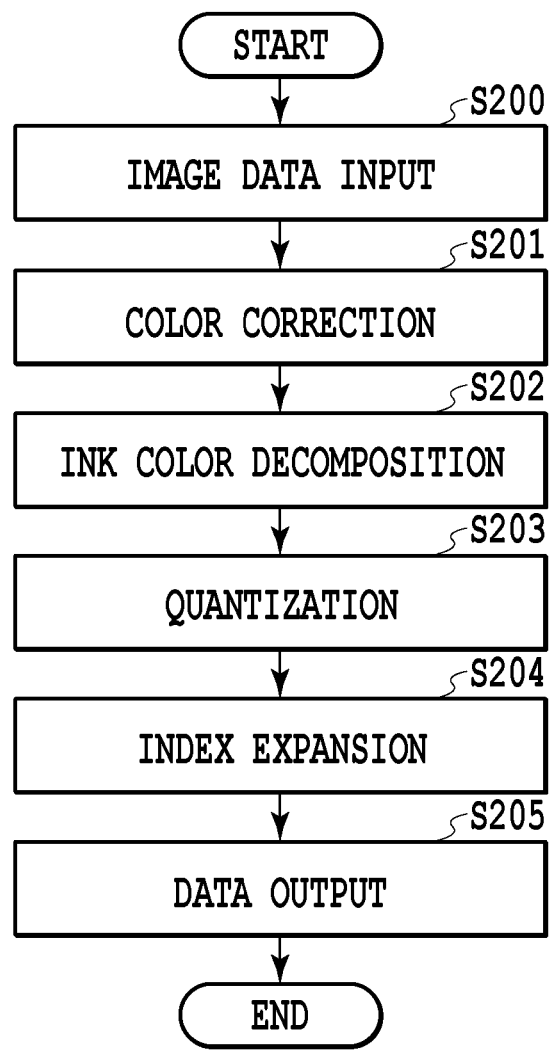
FIG. 2 is a flowchart for explaining an image data process.
Figure 3:
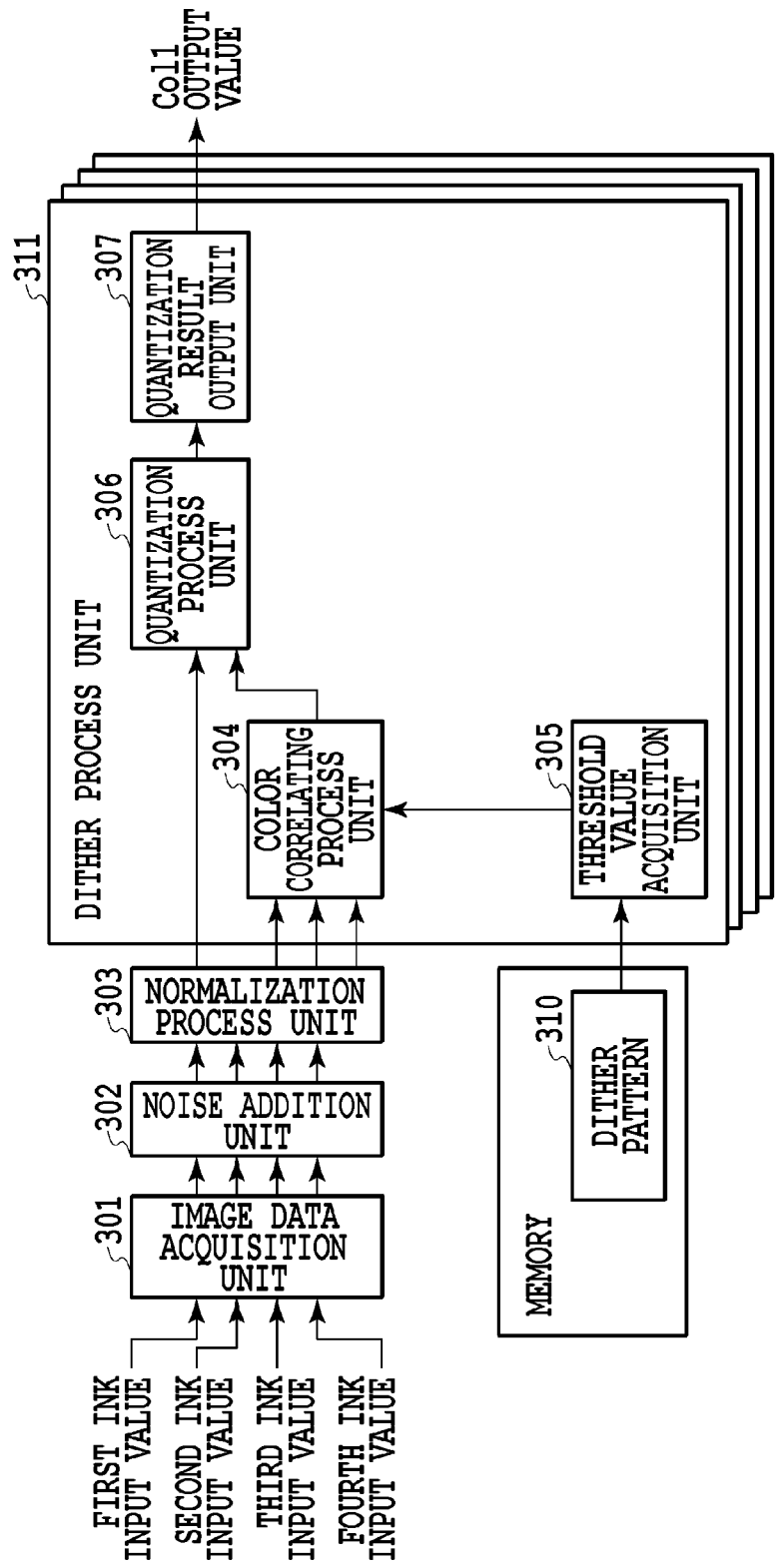
FIG. 3 is a block diagram for explaining the detail of a quantization process.
Figure 4A:
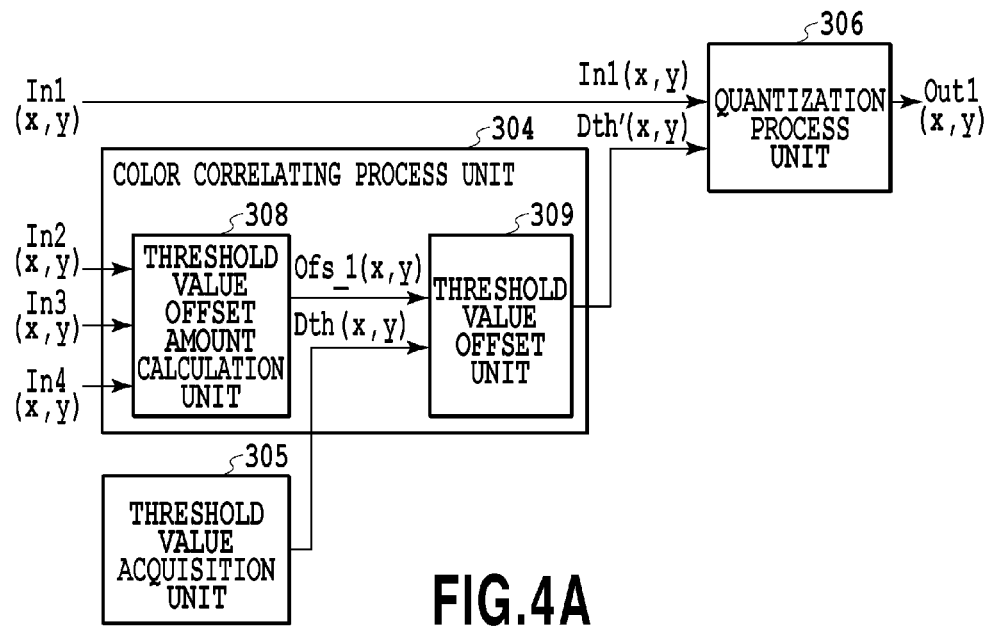
FIGS. 4A and 4B are diagrams illustrating the configuration of and processing steps in a color correlating process unit.
Figure 4B:
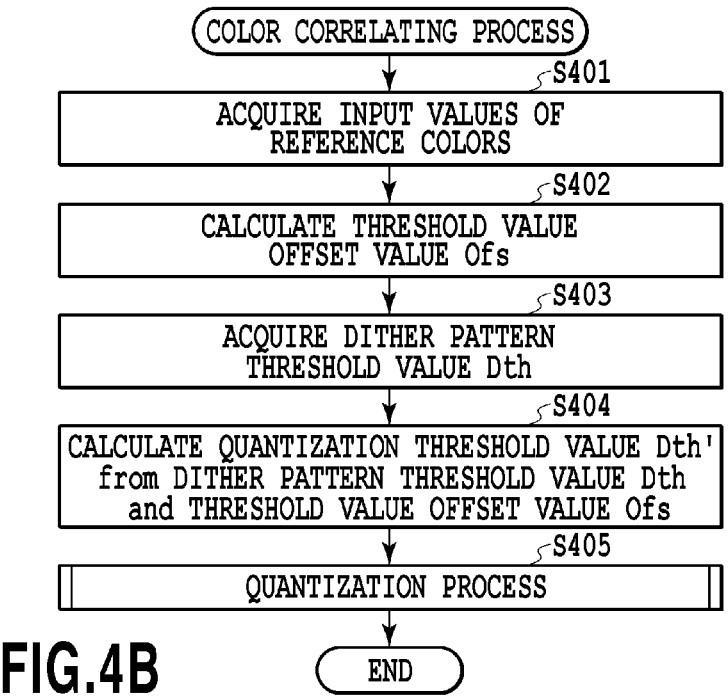

On the other hand, in the image processing apparatus 2, an image processing apparatus main control unit 108 is one for performing various processes on an image supplied from the image supply device 3, and thereby generating image data printable by the printing apparatus 1, and includes a CPU, ROM, RAM, and the like. The below-described characteristics configuration of the present invention illustrated in FIGS. 3 and 4A is also provided in the image processing apparatus main control unit 108, and flowcharts to be described with FIGS. 2 and 4B are performed by the CPU of the image processing apparatus main control unit 108. An image processing apparatus interface (I/F) 109 transceives a data signal with the printing apparatus 1. An externally connecting interface (I/F) 113 transceives image data with the image supply device 3 externally connected. A display unit 110 displays various pieces of information to a user, and can be applied with a display such as an LCD. An operation unit 111 is a mechanism for a user to perform a command operation, and can be applied with, for example, a keyboard and a mouse. A system bus 112 connects the image processing apparatus main control unit 108 and the respective functions to each other.

FIG. 2 is a flowchart for explaining an image data process performed by the image processing apparatus main control unit 108 in the present embodiment. This process is performed by the CPU provided in the image processing apparatus main control unit 108 in accordance with a program stored in the ROM. In FIG. 2, when image data on a target pixel is inputted from the image supply device 3 (Step S200), the image processing apparatus main control unit 108 first makes a color correction in Step S201. The image data received by the image processing apparatus 2 from the image supply device 3 includes pieces of R (red), G (green), and B (blue) 8-bit luminance data for expressing standardized color space such as sRGB. In Step S201, these pieces of luminance data are converted to pieces of RGB 12-bit luminance data corresponding to color space specific to the printing apparatus. As a method for converting a signal value, a publicly known method such as a method that refers to a lookup table (LUT) preliminarily stored in the ROM or the like can be employed.

In Step S202, the image processing apparatus main control unit 108 decomposes the converted pieces of RGB data to pieces of 16-bit gradation data (density data) respectively for C (cyan), M (magenta), Y (yellow) and K (black) that are the ink colors of the printing apparatus. In this step, a 16-bit gray image is generated for each of four channels (four colors). In the ink color decomposition process as well, a lookup table (LUT) preliminarily stored in the ROM or the like can be referred to as in the color correction process.

In Step S203, the image processing apparatus main control unit 108 performs a predetermined quantization process on the pieces of 16-bit gradation data respectively corresponding to the ink colors to convert to pieces of several bit quantized data. For example, in the case of quantization into 3-level data, the pieces of 16-bit gradation data are converted to pieces of 2-bit data each corresponding to any of Level 0 to Level 2. The quantization process will be described later in detail.

In subsequent Step S204, the image processing apparatus main control unit 108 performs an index expansion process. Specifically, from among multiple dot arrangement patterns where the number of dots to be printed in each pixel and a corresponding position are determined, one dot arrangement pattern is selected related to a level obtained in Step S203. Then, resultant pieces of dot data are outputted as pieces of binary data (Step S205). This completes the image data process.

FIG. 3 is a block diagram for explaining the detail of the quantization process performed in Step S203 of FIG. 2. The quantization process in the present invention is performed in accordance with a dither method. In the quantization process in the present embodiment, an input value is first processed, then a threshold value is processed, and then the quantization process is performed. These series of processes are parallel performed on a color basis (on a channel basis). In the following, each of the processes will be described in detail with reference to FIG. 3.

An image data acquisition unit 301 acquires pieces of 16-bit gradation data indicating the density of each pixel. It is assumed that the image data acquisition unit 301 in the present embodiment can receive signals having at most 16 bits for eight colors. The diagram illustrates a state where the pieces of 16-bit data respectively on first to fourth inks are inputted.

A noise addition process unit 302 adds predetermined noise to the pieces of 16-bit gradation data. By adding the noise, even in the case where pieces of gradation data of the same level are continuously inputted, a state where the same patterns are continuously arranged can be avoided to reduce a strip, texture, and the like. The noise addition process unit 302 multiplies a predetermined random table, fixed intensity, and variable intensity corresponding to an input value, and thereby noise is generated for each pixel and added to the input value. Note that the random table is a table adapted to set the polarity of noise, and sets a plus, zero, or a minus for each pixel position. The random table in the present embodiment can have at most eight faces, and the size of each table can be arbitrarily set. The fixed intensity indicates the intensity of a noise amount, and the magnitude of the intensity determines whether noise is large or small. In the present embodiment, by setting a random table or fixed intensity optimum for each print mode depending on the graininess of, the degrees of stripe and texture of an image, and the like, a noise amount can be appropriately adjusted.

A normalization process unit 303 relates a gradation value of each pixel represented by 16 bits to a level value enabling the index expansion in Step S204, and then normalizes each level range to 12 bits. In the following, a specific description will be given. In the case where the index expansion process in Step S204 is a process corresponding to n values from Level 0 to Level (n−1), the normalization process unit 303 equally divides 65535 gradations represented by 16 bits into (n−1). Further, a range corresponding to each level is normalized to 12 bits (4096 gradations). This makes it possible to, for each pixel, obtain pieces of 12-bit data related to any of Level 0 to Level (n−1).

For example, in the case where the index expansion process corresponds to three values of Level 0, Level 1, and Level 2, the normalization process unit 303 equally divides the 65535 gradations represented by 16 bits into two. Then, the normalization process unit 303 normalizes respective ranges corresponding to gradation values of 0 to 32767 and gradation values of 32768 to 65535 to 12 bits (0 to 4095 gradations). For a pixel corresponding to the input gradation values of 0 to 32767 as the first range, Level 0 or Level 1 is outputted by the subsequent quantization process, whereas for a pixel corresponding to the input gradation values of 32768 to 65535 as the second range, Level 1 or Level 2 is outputted by the subsequent quantization process. By the above-described control, even in the case where a quantization number (n) is any number, the subsequent quantization process can be performed in the same manner.

The processes in the image data acquisition unit 301 to the normalization process unit 303 described above are parallel performed on the pieces of gradation data on the respective colors. That is, in the present embodiment, the pieces of 12-bit data on black, cyan, magenta, and yellow are generated, and inputted to a dither process unit 311.

In the dither process unit 311, 12-bit data to be quantized (processing target data) is directly transmitted to a quantization process unit 306. On the other hand, pieces of 12-bit data on colors other than the processing target data are inputted to a color correlating process unit 304 as pieces of reference data. The color correlating process unit 304 performs a predetermined process on a threshold value acquired by a threshold value acquisition unit 305 on the basis of the pieces of reference data to determine a final threshold value, and transmits the final threshold value to the quantization process unit 306. The quantization process unit 306 compares the processing target data with the threshold value inputted from the color correlating process unit 304, and thereby determines printing (1) or non-printing (0).

The threshold value acquisition unit 305 acquires a threshold value corresponding to a pixel position associated with the processing target data from a dither pattern 310 stored in a memory such as the ROM. In the present embodiment, the dither pattern 310 is a threshold value matrix formed by arraying threshold values of 0 to 4095 so as to have blue noise characteristics, and can provide various sizes and shapes such as 512×512 pixels, 256×256 pixels, and 512×256 pixels. That is, the memory preliminarily stores multiple threshold value matrices having different sizes and shapes as described, and the threshold value acquisition unit 305 selects a threshold value matrix corresponding to a print mode from among the multiple threshold value matrices. Then, from among multiple threshold values arrayed in the selected threshold value matrix, the threshold value acquisition unit 305 provides a threshold value corresponding to the pixel position (x, y) associated with the processing target data to the color correlating process unit. In the following, a method for determining a threshold value in the color correlating process unit 304 will be described in detail.

FIGS. 4A and 4B are a block diagram and a flowchart, respectively, for explaining the configuration and steps of a process in the color correlating process unit 304. The color correlating process unit 304 sets the pieces of 12-bit data corresponding to the colors other than the processing target data as the pieces of reference data, uses these pieces of reference data to perform the predetermined process on the threshold value acquired by the threshold value acquisition unit 305, and calculates the threshold value for quantizing the processing target data. For example, in the case where the processing target data is 12-bit data on black, the pieces of reference data are pieces of 12-bit data on cyan, magenta, and yellow. In FIGS. 3 and 4, the processing target data is denoted by In1 (x, y), and the pieces of reference data are denoted by In2 (x, y), In3 (x, y), and In4 (x, y). Here, (x, y) represents the pixel position, which serves as a coordinate parameter for the threshold value acquisition unit 305 to select the threshold value corresponding to the pixel position associated with the processing target data from among the threshold value matrix.

Referring to FIG. 4A, the pieces of reference data In2 (x, y) to In4 (x, y) inputted to the color correlating process unit 304 are first inputted to a threshold value offset amount calculation unit 308 (Step S401). In doing so, the threshold value offset amount calculation unit 308 uses these pieces of reference data to calculate a threshold value offset Ofs_1 (x, y) for the processing target data In1 (x, y) (Step S402). In the present embodiment, the threshold value offset value Ofs_1 (x, y) is calculated in accordance with Expression 2.

$$\text{Ofs\_1}(x,y) = \Sigma i[\text{Ini}(x,y)] \quad \text{(Expression 2)}$$

Here, i represents a parameter individually indicating, among the pieces of reference data In2 (x, y) to In1 (x, y), reference data (hereinafter referred to as actual reference data) used to obtain the threshold value for the processing target data In1. The number and type of such pieces of actual reference data are predesignated for each processing target data.

In the present embodiment, it is assumed that in the case where the processing target data is In1 (x, y), the actual reference data is null, and in the case where the processing target data is In2 (x, y), In1 (x, y) is the actual reference data. It is also assumed that in the case where the processing target data is In3 (x, y), In1 (x, y) and In2 (x, y) are the pieces of actual reference data, and in the case where the processing target data is In4 (x, y), In1 (x, y), In2 (x, y), and In3 (x, y) are the pieces of actual reference data. Accordingly, offsets Ofs_1 (x, y) to Ofs_4 (x, y) for the respective pieces of processing target data In1 (x, y) to In4 (x, y) can be expressed as follows in accordance with Expression 2.

$$\text{Ofs\_1}(x, y) = \Sigma i[\text{In}(x, y)] \quad \text{(Expression 2-1)}$$
$$= 0$$

$$\text{Ofs\_2}(x, y) = \Sigma i[\text{In}(x, y)] \quad \text{(Expression 2-2)}$$
$$= \text{In1}(x, y)$$

$$\text{Ofs\_3}(x, y) = \Sigma i[\text{In}(x, y)] \quad \text{(Expression 2-3)}$$
$$= \text{In1}(x, y) + \text{In2}(x, y)$$

$$\text{Ofs\_4}(x, y) = \Sigma i[\text{In}(x, y)] \quad \text{(Expression 2-4)}$$
$$= \text{In1}(x, y) + \text{In2}(x, y) + \text{In3}(x, y)$$

As described when the threshold value offset values Ofs_1 (x, y) to Ofs_4 (x, y) are calculated, these values are inputted to a threshold value offset unit 309. On the other hand, the threshold value offset unit 309 acquires a threshold value Dth corresponding to the coordinates (x, y) of processing target data In(x, y) from the threshold value acquisition unit 305 (Step S403).

In Step S404, as described below, a difference between the threshold value Dth (x, y) and the processing target data is offset by the threshold value offset unit 309. The threshold value offset unit 309 subtracts the threshold value offset value Ofs_1 (x, y) inputted from the threshold value offset amount calculation unit 308 from the threshold value Dth (x, y) inputted from the threshold value acquisition unit 305 to obtain a quantization threshold value Dth' (x, y).

$$\text{Dth'}(x,y) = \text{Dth}(x,y) - \text{Ofs\_1}(x,y) \quad \text{(Expression 3)}$$

In so doing, in the case where Dth' (x, y) takes a minus value, Dth_max (the maximum value of threshold values in the dither pattern) is added, and a resultant value is treated as the quantization threshold value Dth' (x, y). In doing so, the quantization threshold value Dth' is constantly Dth'=0 to Dth_max.

That is, in the case where Dth' (x, y)<0, the following expression holds:

$$\text{Dth'}(x,y) = \text{Dth'}(x,y) + \text{Dth\_max} \quad \text{(Expression 4)}$$

When the quantization threshold value Dth' (x, y) is obtained in accordance with Expression 3 or 4, the quantization process unit 306 compares the processing target data In1 (x, y) and the quantization threshold value Dth' (x, y) with each other to determine dot printing (1) or non-printing (0) for the pixel position (x, y). This completes the processing steps.

As described above, the quantization process unit 306 compares the processing target data and the quantization threshold value with each other in a state a difference between the threshold value Dth (x, y) and the processing target data have been offset by the threshold value offset unit.

After that, as described with the flowchart in FIG. 2, quantized data Out1 (x, y) represented by several bits is subjected to the index expansion process, and a dot pattern to be printed at the pixel position (x, y) is determined. In so doing, the number of dots to be printed at the pixel position (x, y) is set to be a number corresponding to a level value, such as one dot when the level value is 1, or two dots when the level value is 2.

Figure 5:
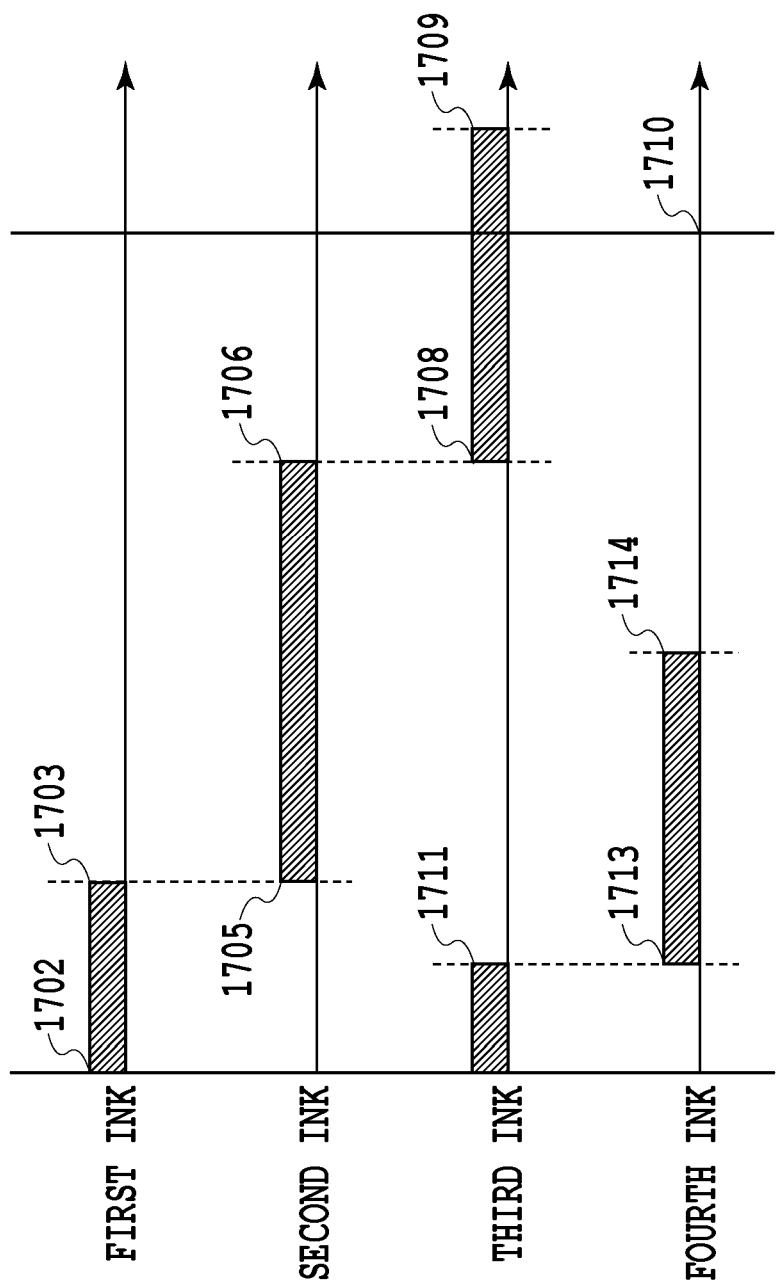
FIG. 5 is a diagram illustrating ranges of threshold values determined as printing (1) for respective colors.

FIG. 5 is a diagram illustrating ranges of threshold values determined as printing (1) among the multiple threshold values 0 to Dth_max arranged in the dither pattern 310 when the first to fourth pieces of multi-valued data (In1 to In4) are inputted respectively for the first to fourth inks, respectively. The horizontal axis represents a threshold value 0 to 4094, and "1710" represents Dth_max (the maximum value among the threshold values in the dither pattern). Each thick line indicates a threshold value range where dots are arranged. In the present embodiment, the offset of the first ink is Ofs_1=0 from Expression 2-1. Accordingly, pixel positions corresponding to threshold values of 0 to In1(1702 to 1703) among 0 to Dth_max are set to printing (1).

The offset of the second ink is Ofs_2=In1 from Expression 2-2. Accordingly, as a result of quantization using the threshold value Dth' obtained in accordance with Expressions 3 and 4, threshold values of In1 to In1+In2 (1705 to 1706) among the threshold values 0 to Dth_max arrayed in the dither pattern 310 are set to printing (1).

The offset of the third ink is Ofs_3=In1+In2 from Expression 2-3. Accordingly, as a result of quantization using the threshold value Dth' obtained in accordance with Expressions 3 and 4, In1+In2 to In1+In2+In3 (1708 to 1709) among the threshold values 0 to Dth_max arrayed in the dither pattern 310 are set to printing (1). Note that in this example, In1+In2+In3 are assumed to exceed Dth_max. In this case, an area exceeding Dth_max is treated as follows. That is, an area corresponding to the remainder obtained by dividing (In1+In2+In3) by Dth_max, i.e., threshold values of 0 to In1+In2+In3−Dth_max are set to printing (1). In other words, In1+In2 to Dth_max (1708 to 1710) and 0 to In1+In2+In3−Dth_max (1707 to 1711) are threshold value ranges determined as printing (1).

The offset of the fourth ink is Ofs_4=In1+In2+In3 from Expression 2-4. Accordingly, as a result of quantization using the threshold value Dth' obtained in accordance with Expressions 3 and 4, In1+In2+In3 to In1+In2+In3+In4 among the threshold values 0 to Dth_max arrayed in the dither pattern 310 are threshold values set to printing (1). Note that in this example, the entire area of In1+In2+In3 to In1+In2+In3+In4 exceeds Dth_max. Therefore, an area corresponding to the remainder obtained by dividing (In1+In2+In3+In4) by Dth_max, i.e., threshold values of In1+In2+In3−Dth_max to In1+In2+In3+In4−Dth_max (1713 to 1714) are set to printing (1).

As described, in the present embodiment, despite using the common threshold value Dth, the quantization threshold values Dth' specific to the respective colors are obtained by setting the mutual input values as the offset values. Further, by using the newly obtained quantization threshold values Dth' for the quantization process, dots can be arranged such that a dot print pattern in which the multiple colors are mixed have blue noise characteristics.

Meanwhile, as has been described, a dither pattern used in the present embodiment is a threshold value matrix having blue noise characteristics. That is, when arranging dots sequentially from a pixel having the smallest threshold value, threshold values are arranged so as to obtain preferable dispersibility in any type of gradation. For this reason, in the case of a color printed in pixels having continuous threshold values from a minimum value to a predetermined value, like the first ink, a printed image has blue noise characteristics and obtains preferable dispersibility. However, in contrast, the "pseudo contour" described in Description of the Related Art is also a concern.

On the other hand, in the case of a color printed in pixels having continuous threshold values other than values from the minimum value to the predetermined value, like the second ink to the fourth ink, sufficient blue noise characteristics cannot be obtained.

Figure 6A:
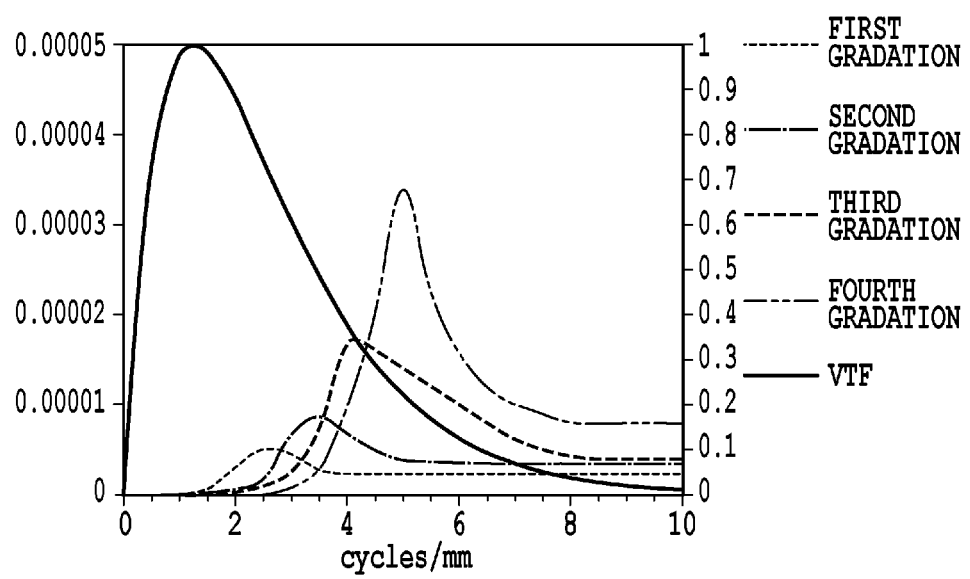
FIGS. 6A and 6B are diagrams illustrating frequency characteristics of first and second inks.
Figure 6B:
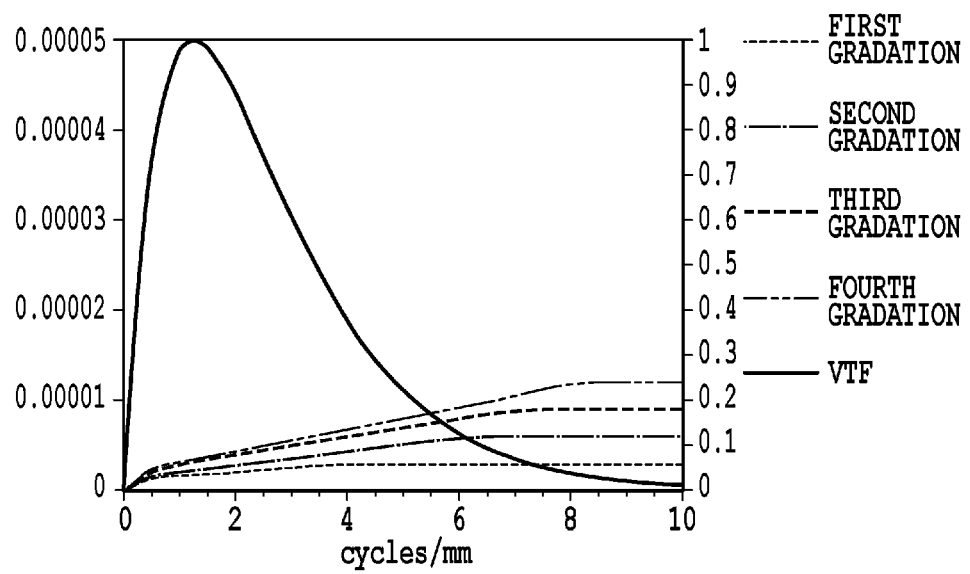
Figure 11A:
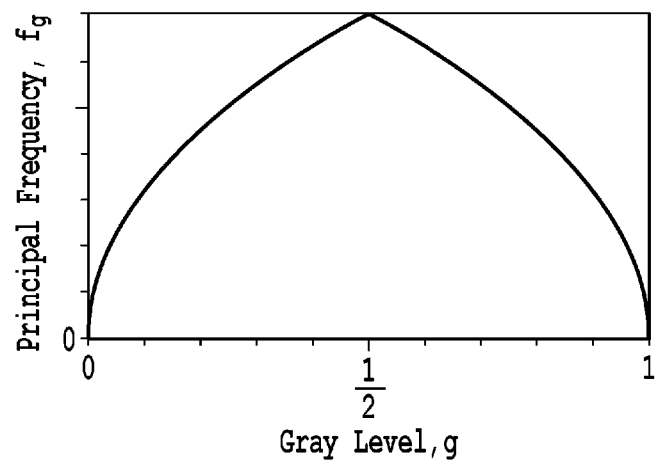
FIGS. 11A and 11B are diagrams illustrating the relationship between a gradation value and a principal frequency.
Figure 11B:
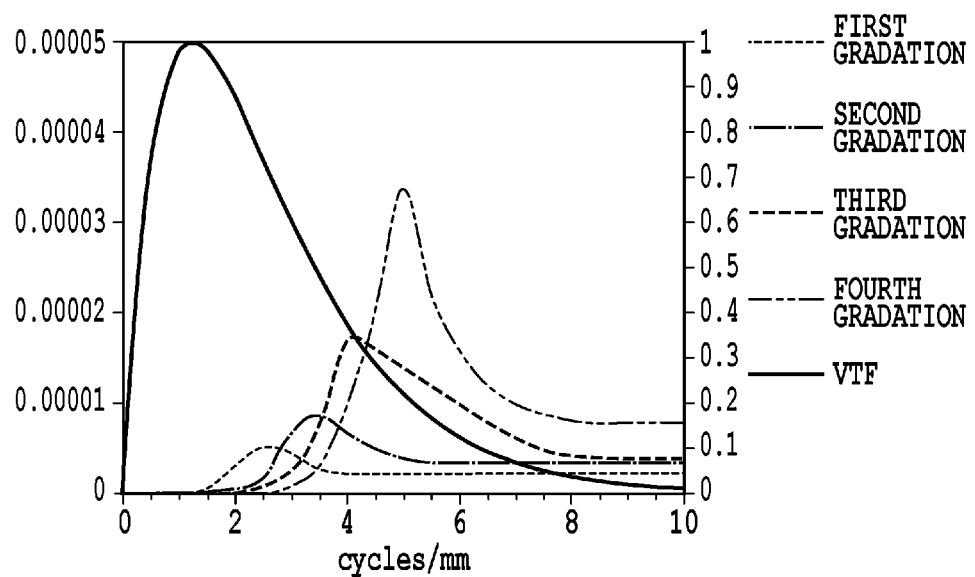

FIGS. 6A and 6B are diagrams illustrating frequency characteristics of the first and second inks in four types of gradation having lower gray levels together with the visual characteristics (VTF) as with FIG. 11B. FIG. 6A illustrates the frequency characteristics of the first ink, and FIG. 6B illustrates the frequency characteristics of the second ink. In the case of the first ink having blue noise characteristics, in any type of gradation, the power of a lower frequency component is suppressed to nearly zero, and at a principal frequency fg, a peak appears. That is, preferable dispersibility can be obtained, but the "pseudo contour" as described in Description of the Related Art is a concern.

On the other hand, in the case of the second ink not having blue noise characteristics, in any type of gradation, the power gradually monotonously increases from the lower frequency range toward the higher frequency range, and no peak appears. That is, dispersibility is worse than that of the first ink. However, even in the case where a switch between types of gradation is present, such as a switch from the first gradation to the second gradation, or a switch from the second gradation to the third gradation, the difference in dot pattern is not visually recognized, and therefore the "pseudo contour" is difficult to recognize.

In the case of using four colors of cyan, magenta, yellow, and black as in the present embodiment, it can be said that setting the black ink having the highest contrast as the first ink is preferable as long as only dispersibility is focused on. However, when taking into consideration the pseudo contour together with the dispersibility, the pseudo contour is most conspicuous in the case of the black ink, and it turns out that between the dispersibility and the pseudo contour, there is a tradeoff relationship. In such circumstances, the present inventors have determined that in consideration of both the dispersibility and the pseudo contour, in the case of black, reducing the pseudo contour should be given priority rather than increasing the dispersibility. For this reason, in the present embodiment, as the first ink, not black but cyan is set; as the second ink, black is set; as the third ink, magenta is set; and as the fourth ink, yellow is set.

In doing so, in the case of a mixed color image using the four colors of cyan, magenta, yellow, and black, the image making the pseudo contour inconspicuous despite suppressing graininess to some extent can be outputted.

In addition, a method as described above may be used for offsetting a difference between the threshold value Dth(x, y) and the processing target data. For example, the quantization process unit 306 or further unit add a value corresponding to the threshold value offset value to the processing target data instead of subtracting the offset value inputted from the threshold value offset amount calculation unit 308 from the threshold value by the threshold value offset amount addition unit 309.

Second Embodiment

In the present embodiment, black is set as a second ink as in the first embodiment, and in addition, an ink color decomposition process that further reduces the graininess of black is performed. In the present embodiment as well, the inkjet printing system and the quantization process described with FIGS. 1 to 4B are used.

Figure 7:
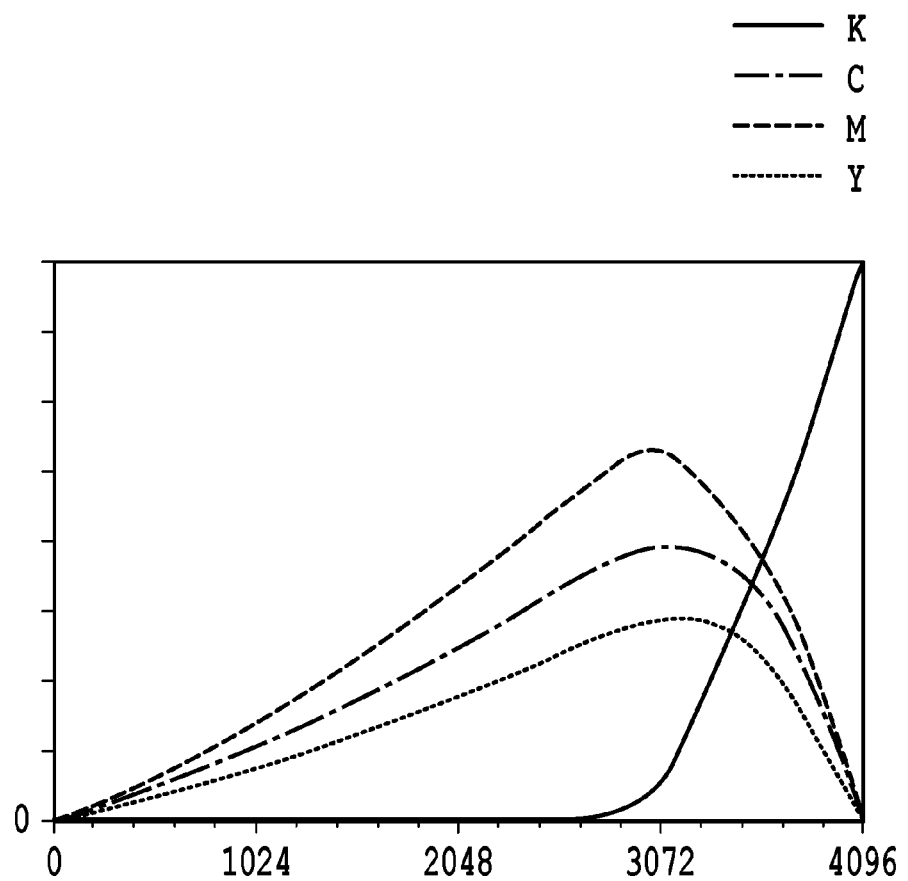
FIG. 7 is a diagram illustrating the features of an ink color decomposition process in a second embodiment.

FIG. 7 is a diagram illustrating the features of the ink color decomposition process in the present embodiment performed in Step S202 of FIG. 2. In the ink color decomposition process, signal value conversion is performed such that various colors expressed by R (red), G (green), and B (blue) are expressed by four colors of cyan, magenta, yellow, and black. FIG. 7 illustrates a state where a gray line expressed by R (red), G (green), and B (blue) is converted to 16-bit signals of cyan, magenta, yellow, and black. The horizontal axis represents a gray gradation level, and 0 corresponds to white, whereas 4096 corresponds to black. In the ink color decomposition process in the present embodiment, an output value of a black ink is suppressed to be zero from 0 to an intermediate density range. That is, in a gray color range having high lightness from white to intermediate density, gray is expressed by three colors of cyan, magenta, and yellow, and no black dot is printed. In addition, from a gradation level nearly exceeding the intermediate density, the black output value is gradually increased, whereas cyan, magenta, and yellow output values are decreased. At the highest density (4096), only black is printed, whereas the cyan, magenta, and yellow output values are set to be zero.

Here, the gray line is taken as an example to give the description; however, in the present embodiment, ink color conversion that suppresses the black output value to be zero at least from the highlight to the intermediate density is performed in any hue. For this reason, a situation where black dots are sparsely printed in a blank area does not arise. In gradation where black dots are sparsely printed, relatively large amounts of the other inks are inevitably printed. That is, even in a state where black dots are sparsely printed, the contrast itself of black dots is inconspicuous, and even in the case where the dispersibility of black dots is low, graininess does not easily become problematic.

Further, from the intermediate density to the highest density, the number of color dots decreases; however, in such gradation, a large number of black dots are printed, and the surface of a print medium comes into a state of being nearly filled with the dots. For this reason, in such gradation as well, the graininess of black dots is inconspicuous.

As described above, according to the present embodiment, in a mixed color image using the four colors of cyan, magenta, yellow, and black, lightness at which a dot is printed at first is shifted between CMY dots and K dots. This makes it possible to, despite suppressing graininess in a more positive manner, output a high quality image where no pseudo contour is recognized.

Third Embodiment

In any of the above-described embodiments, the inkjet printing system using the inks of the four colors of cyan, magenta, yellow, and black is described. On the other hand, the present embodiment additionally uses a gray ink as well. Further, as in the second embodiment, an ink color decomposition process that reduces the graininess of a black ink in a positive manner is performed. In addition, in the present embodiment as well, the inkjet printing system and the quantization process described with FIGS. 1 to 4B are performed.

Figure 8A:
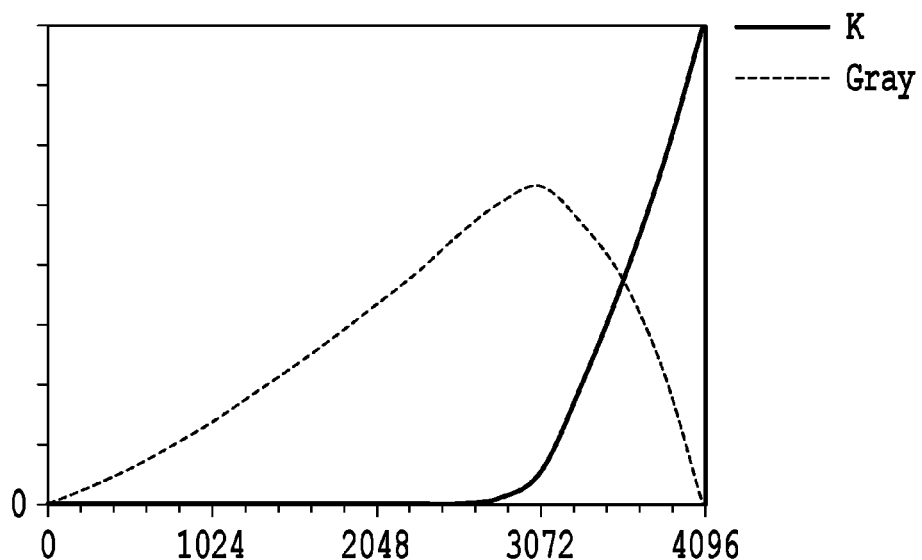
FIGS. 8A and 8B are diagrams illustrating the features of an ink color decomposition process in a third embodiment.
Figure 8B:
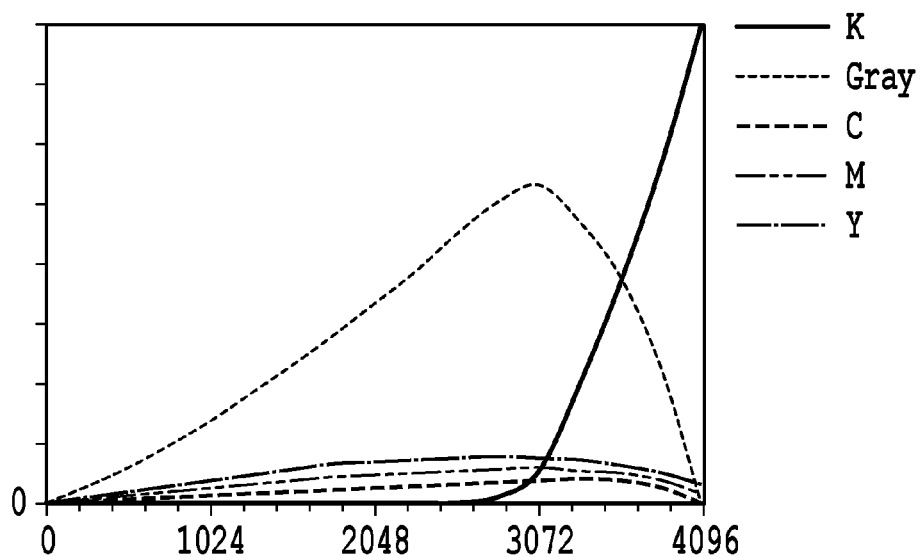
Figures 9A, 9B, 9C:
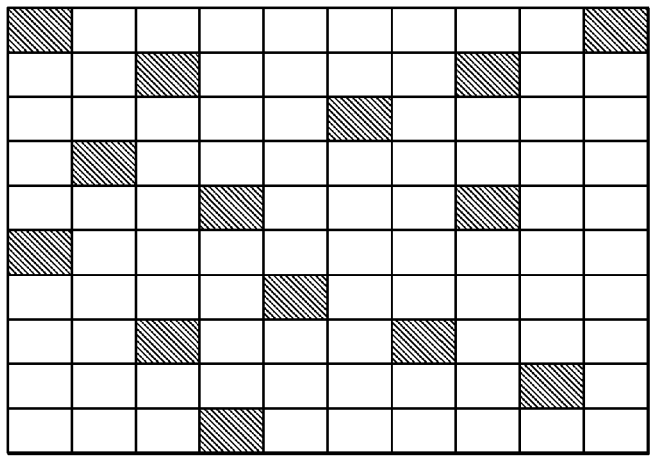
FIGS. 9A to 9C are diagrams for explaining a dither process.
Figure 10A:
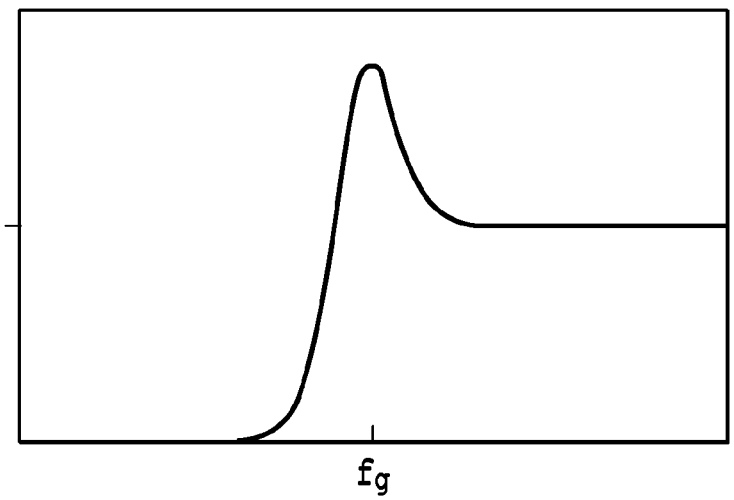
FIGS. 10A and 10B are diagrams illustrating blue noise characteristics and human visual characteristics.
Figure 10B:
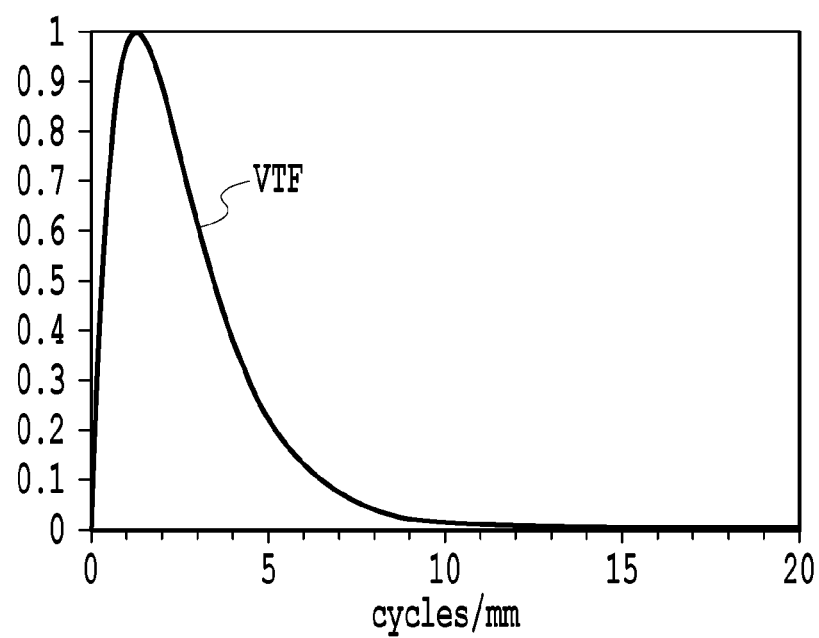

FIGS. 8A and 8B are diagrams for explaining the features of the ink color decomposition process in the present embodiment performed in Step S202 of FIG. 2. In the diagrams, as in FIG. 7, a state where a gray line is converted into 16-bit gradation data on each ink color. FIG. 8A illustrates the case where the gray line is expressed only by a gray ink and a black ink. From 0 to an intermediate density area, only the gray ink is used, whereas an output value of the black ink is suppressed to be zero. Further, from a gradation level nearly exceeding the intermediate density, the black ink output value is gradually increased, whereas a gray output value is decreased, and at the highest density (4096), only black is outputted.

On the other hand, FIG. 8B illustrates the case where the gray line is expressed using, in addition to the gray ink and the black ink, cyan, magenta, and yellow inks. From 0 to an intermediate density region, the gray, cyan, magenta, and yellow inks are used, whereas a black ink output value is suppressed to be zero. Further, from a gradation level nearly exceeding the intermediate density, the black output value is gradually increased, whereas output values of the other colors are decreased, and at the highest density (4096), only black is outputted.

As described above, even in the case of performing the ink color decomposition process using the gray ink as in FIG. 8A or 8B, in gradation where black dots are sparsely printed, relatively large amounts of the other inks are inevitably printed. As a result, without making black dot contrast conspicuous, an image where graininess and a pseudo contour are both suppressed can be outputted.

Note that in any of the above-described embodiments, the black ink is set as the second ink, i.e., for a channel having a second lowest threshold value range; however, present invention is not limited to such a configuration. As long as a black ink having the highest dot contrast can be set for a channel having a threshold value range where an offset amount is not zero, i.e., as any of the second to fourth inks, the effect of the present invention can be sufficiently obtained. Also, as long as the above condition is satisfied, multiple ink colors can be set for the same channel. For example, it is also possible that as the first ink, cyan is set; as the second ink, black is set; and as the third ink, magenta and yellow of which graininess is unlikely to be conspicuous is set. Any of cyan, magenta, and yellow can be set as the first ink, and optimally set in accordance with ink characteristics.

Further, in the third embodiment, a configuration additionally including the gray ink is described; however, a configuration additionally including a particular color ink such as red, green, or blue, or light cyan or light magenta ink of which color material density is lower than that of cyan or magenta is also possible.

Also, the above description is given on the basis of the configuration where 16-bit data is quantized into several levels by the quantization process, and then a dot pattern corresponding to a level is related by the index expansion process; however, a way to express a multi-valued level is not limited to the index expansion. In the case where dots having multiple sizes are printable, or in the case where inks having multiple different densities are ejectable, printing can also be performed with a dot size or ink density related to each level. Even in the case of expressing a quantized level value in any manner, a dot array state can be made depending on a threshold value array state of an original dither pattern. That is, even in the case of expressing a quantized level value in any manner, as long as a black ink having the highest dot contrast is set for a channel other than that for the first ink having the lowest threshold value range, the effect of the present invention can be sufficiently obtained.

In addition, the quantization process performed in Step S203 is not necessarily required to be a multi-valued quantization process that converts to several-bit multi-valued data. That is, the quantization process in Step S203 may directly convert 16-bit gradation data to 1-bit binary data through a dither process. In this case, the index expansion process described in Step S204 is omitted, and binary data obtained in Step S203 is directly outputted to the printing apparatus 1.

Note that any of the above embodiments is described on the basis of the configuration where all the steps illustrated in FIG. 2 are performed in the image processing apparatus 2; however, as long as each of the above processes is performed in the inkjet printing system in the present embodiment illustrated in FIG. 1, the steps may be performed in any device. For example, a configuration where the steps up to the quantization in Step S203 are performed by the image processing apparatus 2, and the index process in Step S204 is performed in the printing apparatus 1 is also possible. Also, it may be configured that the printing apparatus 1 includes the function of the image processing apparatus 2 described above, and all the steps subsequent to Step S201 are performed in the printing apparatus 1. In this case, the printing apparatus 1 serves as the image processing apparatus of the present invention.

A bit number of input/output data in each of the above-described steps is not limited to that in any of the above-described embodiments. In order to keep accuracy, an output bit number may be made larger than an input bit number, and a bit number may be variously adjusted depending on application or situations.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-254017, filed Dec. 16, 2014, which is hereby incorporated by reference wherein in its entirety.

What is claimed is:

1. An image processing apparatus for printing an image on a print medium with use of multiple inks, the image processing apparatus comprising one or more processors and one or more computer-readable medias storing a program, the one or more processors and one or more computer-readable media executing the program to function as:
    a data acquisition unit configured to, for a target pixel, acquire first multi-valued data corresponding to a first ink, second multi-valued data corresponding to a second ink and third multi-valued data corresponding to a third ink;
    a threshold value acquisition unit configured to acquire a first threshold value corresponding to the target pixel from a threshold value matrix that indicates an array of multiple threshold values;
    a calculating unit configured to calculate a second threshold value by offsetting the first threshold value with use of the first multi-valued data, and a third threshold value by offsetting the first threshold value with use of the first multi-valued data and the second multi-valued data; and
    a generating unit configured to generate first quantized data for printing a dot of the first ink by comparing the first multi-valued data and the first threshold value, generate second quantized data for printing a dot of the second ink by comparing the second multi-valued data and the second threshold value, and generate third quantized data for printing a dot of the third ink by comparing the third multi-valued data and the third threshold value,
    wherein:
    the threshold value matrix is characterized in that dispersibility of dots printed at positions corresponding to threshold values being continuous from a minimum value to a predetermined value is higher than dispersibility of dots printed at positions corresponding to threshold values being continuous except for from the minimum value to the predetermined value; and
    the first ink is an ink of a color different from black, and the second ink is a black ink.

2. The image processing apparatus according to claim 1, wherein the calculating unit calculates the second threshold value by subtracting the first multi-valued data from the first threshold value and calculates the third threshold value by subtracting a sum of the first multi-valued data and the second multi-valued data from the first threshold value.

3. The image processing apparatus according to claim 1, wherein:
    the data acquisition unit further acquires fourth multi-valued data corresponding to a fourth ink;
    the calculating unit calculates a fourth threshold value by offsetting the first threshold value with use of the first multi-valued data, the second multi-valued data, and the third multi-valued data; and
    the generating unit generates fourth quantized data for printing a dot of the fourth ink by comparing the fourth multi-valued data and the fourth threshold value.

4. The image processing apparatus according to claim 3, wherein the calculating unit calculates the fourth threshold value by subtracting a sum of the first multi-valued data, the second multi-valued data, and the third multi-valued data from the first threshold value.

5. The image processing apparatus according to claim 1, wherein the first ink is any of cyan, magenta, yellow, red, green, blue, and gray inks, or an ink of which color material density is different from the above-described inks.

6. The image processing apparatus according to claim 1, further comprising an ink color decomposition unit which, for the target pixel, converts pieces of RGB luminance data to pieces of density data respectively corresponding to the multiple inks,
    wherein the ink color decomposition unit converts the pieces of RGB luminance data so as to make density data corresponding to the black ink smaller than pieces of density data corresponding to the other inks in a color range having higher lightness than a middle lightness in an entirely luminance range.

7. The image processing apparatus according to claim 1, wherein the threshold value matrix has a blue noise characteristics.

8. The image processing apparatus according to claim 1, wherein the threshold value matrix is formed so as to keep power at a low frequency lower than power at a high frequency in a dot pattern to be printed.

9. The image processing apparatus according to claim 1, further comprising a printing unit which prints the image on the print medium by printing the first ink in accordance with the first quantized data and printing the second ink in accordance with the second quantized data.

10. An image processing method for printing an image on a print medium with use of multiple inks, the image processing method comprising steps of:
    acquiring, for a target pixel, first multi-valued data corresponding to a first ink, second multi-valued data corresponding to a second ink and third multi-valued data corresponding to a third ink;
    reading out a first threshold value corresponding to the target pixel from a threshold value matrix that indicates an array of multiple threshold values;
    calculating a second threshold value by offsetting the first threshold value with use of the first multi-valued data, and a third threshold value by offsetting the first threshold value with use of the first multi-valued data and the second multi-valued data; and
    generating first quantized data for printing a dot of the first ink by comparing the first multi-valued data and the first threshold value, generating second quantized data for printing a dot of the second ink by comparing the second multi-valued data and the second threshold value, and generating third quantized data for printing a dot of the third ink by comparing the third multi-valued data and the third threshold value,
wherein:
the threshold value matrix is characterized in that dispersibility of dots printed at positions corresponding to threshold values being continuous from a minimum value to a predetermined value is higher than dispersibility of dots printed at positions corresponding to threshold values are continuous except for from the minimum value to the predetermined value; and
the first ink is an ink of a color different from black, and the second ink is a black ink.

11. The image processing method according to claim 10, wherein the calculating step calculates the second threshold value by subtracting the first multi-valued data from the first threshold value and calculates the third threshold value by subtracting a sum of the first multi-valued data and the second multi-valued data from the first threshold value.

12. The image processing method according to claim 10, wherein:
the acquiring step further acquires fourth multi-valued data corresponding to a fourth ink;
the calculating step calculates a fourth threshold value by offsetting the first threshold value with use of the first multi-valued data, the second multi-valued data and the third multi-valued data; and
the generating step generates fourth quantized data for printing a dot of the fourth ink by comparing the fourth multi-valued data and the fourth threshold value.

13. The image processing method according to claim 12, wherein the calculating step calculates the fourth threshold value by subtracting a sum of the first multi-valued data, the second multi-valued data, and the third multi-valued data from the first threshold value.

14. The image processing method according to claim 10, wherein the first ink is any of cyan, magenta, yellow, red, green, blue, and gray inks, or an ink of which color material density is different from the above-described inks.

15. The image processing method according to claim 10, further comprising an ink color decomposition step of, for the target pixel, converting pieces of RGB luminance data to pieces of density data respectively corresponding to the multiple inks,
wherein the ink color decomposition step converts the pieces of RGB luminance data so as to make density data corresponding to the black ink smaller than pieces of density data corresponding to the other inks in a color range having higher lightness than a middle lightness in an entirely luminance range.

16. The image processing method according to claim 10, wherein the threshold value matrix has a blue noise characteristics.

17. The image processing method according to claim 10, wherein the threshold value matrix is formed so as to keep power at a low frequency lower than power at a high frequency in a dot pattern to be printed.

18. A non-transitory computer-readable storage medium that stores a program for instructing a computer to function as respective units of an image processing apparatus for printing an image on a print medium with use of multiple inks, wherein the program comprises code to execute:
a data acquisition step of, for a target pixel, acquiring first multi-valued data corresponding to a first ink, second multi-valued data corresponding to a second ink and third multi-valued data corresponding to a third ink;
a threshold value acquisition step of acquiring a first threshold value corresponding to the target pixel from a threshold value matrix that indicates an array of multiple threshold values;
a calculating step of an offsetting unit configured to calculating a second threshold value by offsetting the first threshold value with use of the first multi-valued data, and a third threshold value by offsetting the first threshold value with use of the first multi-valued data and the second multi-valued data; and
a generating step of generating first quantized data for printing a dot of the first ink by comparing the first multi-valued data and the first threshold value, generating second quantized data for printing a dot of the second ink by comparing the second multi-valued data and the second threshold value, and generating third quantized data for printing a dot of the third ink by comparing the third multi-valued data and the third threshold value,
wherein:
the threshold value matrix is characterized in that dispersibility of dots printed at positions corresponding to threshold values being continuous from a minimum value to a predetermined value is higher than dispersibility of dots printed at positions corresponding to threshold values being continuous except for from the minimum value to the predetermined value; and
the first ink is an ink of a color different from black, and the second ink is a black ink.

19. An image processing apparatus for printing an image on a print medium with use of multiple inks, the image processing apparatus comprising one or more processors and one or more computer-readable media storing a program, the one or more processors and one or more computer-readable media executing the program to function as:
a data acquisition unit configured to, for a target pixel, acquire first multi-valued data corresponding to a first ink, second multi-valued data corresponding to a second ink and third multi-valued data corresponding to a third ink;
a threshold value acquisition unit configured to acquire a first threshold value corresponding to the target pixel from a threshold value matrix that indicates an array of multiple threshold values;
an offsetting unit configured to offset the second multi-valued data according to the first multi-valued data and offset the third multi-valued data according to the first multi-valued data and the second multi-valued data; and
a generating unit configured to generate first quantized data for printing a dot of the first ink by comparing the first multi-valued data and the first threshold value, generate second quantized data for printing a dot of the second ink by comparing the second multi-valued data offset by the offsetting unit and the first threshold value and generate third quantized data for printing a dot of the third ink by comparing the third multi-valued data offset by the offsetting unit and the first threshold value,
wherein:
the threshold value matrix is characterized in that dispersibility of dots printed at positions corresponding to threshold values being continuous from a minimum value to a predetermined value is higher than dispersibility of dots printed at positions corresponding to threshold values being continuous except for from the minimum value to the predetermined value; and the first ink is an ink of a color different from black, and the second ink is a black ink.

20. An image processing method for printing an image on a print medium with use of multiple inks, the image processing method comprising steps of:
acquiring, for a target pixel, first multi-valued data corresponding to a first ink, second multi-valued data corresponding to a second ink and third multi-valued data corresponding to a third ink;
reading out a first threshold value corresponding to the target pixel from a threshold value matrix that indicates an array of multiple threshold values;
offsetting the second multi-valued data according to the first multi-valued data, and the third multi-valued data according to the first multi-valued data and the second multi-valued data; and
generating first quantized data for printing a dot of the first ink by comparing the first multi-valued data and the first threshold value, second quantized data for printing a dot of the second ink by comparing the second multi-valued data offset by the offsetting step and the first threshold value, and third quantized data for printing a dot of the third ink by comparing the third multi-valued data offset by the offsetting unit and the first threshold value,
wherein:
the threshold value matrix is characterized in that dispersibility of dots printed at positions corresponding to threshold values being continuous from a minimum value to a predetermined value is higher than dispersibility of dots printed at positions corresponding to threshold values are continuous except for from the minimum value to the predetermined value; and
the first ink is an ink of a color different from black, and the second ink is a black ink.

21. An image processing apparatus for printing an image on a print medium with use of multiple inks, the image processing apparatus comprising one or more processors and one or more computer-readable media storing a program, the one or more processors and one or more computer-readable media executing the program to function as:
a data acquisition unit configured to, for a target pixel, acquire first multi-valued data corresponding to a first ink, second multi-valued data corresponding to a second ink and third multi-valued data corresponding to a third ink;
a threshold value acquisition unit configured to acquire a first threshold value corresponding to the target pixel from a threshold value matrix that indicates an array of multiple threshold values;
a calculating unit configured to calculate a second threshold value by offsetting the first threshold value with use of the first multi-valued data and a third threshold value by offsetting the first threshold value with use of the first multi-valued data and the second multi-valued data; and
a generating unit configured to generate first quantized data for printing a dot of the first ink by comparing the first multi-valued data and the first threshold value that is acquired by the threshold value acquisition unit, generate second quantized data for printing a dot of the second ink by comparing the second multi-valued data and the second threshold value calculated by the calculating unit, and generate third quantized data for printing a dot of the third ink by comparing the third multi-valued data and the third threshold value calculated by the calculating unit,
wherein:
the threshold value matrix is characterized in that dispersibility of dots printed at positions corresponding to threshold values being continuous from a minimum value to a predetermined value is higher than dispersibility of dots printed at positions corresponding to threshold values being continuous except for from the minimum value to the predetermined value; and
the first ink is an ink of a color different from black, and the second ink is a black ink.

22. An image processing apparatus for printing an image on a print medium with use of multiple inks, the image processing apparatus comprising one or more processors and one or more computer-readable media storing a program, the one or more processors and one or more computer-readable media executing the program to function as:
a data acquisition unit configured to, for a target pixel, acquire first multi-valued data corresponding to a first ink, second multi-valued data corresponding to a second ink and third multi-valued data corresponding to a third ink;
a threshold value acquisition unit configured to acquire a first threshold value corresponding to the target pixel from a threshold value matrix that indicates an array of multiple threshold values;
an offsetting unit configured to offset the second multi-valued data according to the first multi-valued data and offset the third multi-valued data according to the first multi-valued data and the second multi-valued data; and
a generating unit configured to generate first quantized data for printing a dot of the first ink by comparing the first multi-valued data that is acquired by the data acquisition unit and the first threshold value, generate second quantized data for printing a dot of the second ink by comparing the second multi-valued data that is offset by the offsetting unit and the first threshold value, and generate third quantized data for printing a dot of the third ink by comparing the third multi-valued data that is offset by the offsetting unit and the first threshold value,
wherein:
the threshold value matrix is characterized in that dispersibility of dots printed at positions corresponding to threshold values being continuous from a minimum value to a predetermined value is higher than dispersibility of dots printed at positions corresponding to threshold values being continuous except for from the minimum value to the predetermined value; and
the first ink is an ink of a color different from black, and the second ink is a black ink.

* * * * *